(12) United States Patent
Criado (10) Patent No.: US 9,193,437 B2
(45) Date of Patent: Nov. 24, 2015

(54) UNMANNED AIR SYSTEM (UAS)

(71) Applicant: The Boeing Company, Chicago, IL (US)

(72) Inventor: Alfredo Criado, Madrid (ES)

(73) Assignee: The Boeing Company, Chicago, IL (US)

( * ) Notice: Subject to any disclaimer, the term of this patent is extended or adjusted under 35 U.S.C. 154(b) by 407 days.

(21) Appl. No.: 13/848,567

(22) Filed: Mar. 21, 2013

(65) Prior Publication Data

US 2013/0306788 A1 Nov. 21, 2013

(30) Foreign Application Priority Data

May 4, 2012 (EP) ..................................... 12382165

(51) Int. Cl.
*B64C 9/38* (2006.01)
*B64C 23/00* (2006.01)
*B64C 39/02* (2006.01)

(52) U.S. Cl.
CPC ................. *B64C 9/38* (2013.01); *B64C 23/005* (2013.01); *B64C 39/024* (2013.01); *B64C 2201/021* (2013.01); *B64C 2201/042* (2013.01); *B64C 2201/104* (2013.01); *B64C 2201/165* (2013.01); *Y02T 50/32* (2013.01); *Y02T 50/44* (2013.01)

(58) Field of Classification Search
CPC .... B64C 9/38; B64C 15/04; B64C 2201/042; B64C 2230/10; B64D 15/04; B64D 2041/005
See application file for complete search history.

(56) References Cited

U.S. PATENT DOCUMENTS

| | | | | |
|---|---|---|---|---|
| 2,391,306 A * | 12/1945 | Gregg | ............................ | 417/182 |
| 3,291,420 A * | 12/1966 | Laing | ............................ | 244/208 |
| 2007/0252029 A1* | 11/2007 | Karem | ............................ | 244/1 R |
| 2011/0003224 A1* | 1/2011 | Scheibert | ....................... | 429/434 |
| 2011/0017426 A1 | 1/2011 | Baumgardt et al. | | |
| 2011/0031353 A1* | 2/2011 | Stolte et al. | .................... | 244/207 |

FOREIGN PATENT DOCUMENTS

WO WO2009080168 A1 7/2009
WO WO2009127652 A2 10/2009

OTHER PUBLICATIONS

Extended European Search Report, EP 12382165, Oct. 10, 2012.

* cited by examiner

*Primary Examiner* — Nicholas McFall
(74) *Attorney, Agent, or Firm* — McDonnell Boehnen Hulbert & Berghoff LLP (57) ABSTRACT

An unmanned air system and method with blown flaps are presented. Air is guided to a fuel cell carried by the unmanned air system. The fuel cell is ventilated by the guided air such that the air is heated by the fuel cell to provide heated air. The heated air is routed from the fuel cell to one or more high lift devices on a lift device of the unmanned air system to provide routed air. The routed air is blown across the high lift devices.

18 Claims, 4 Drawing Sheets

FIG. 1

PRIOR ART

FIG. 2

PRIOR ART

UNMANNED AIR SYSTEM (UAS)

CROSS-REFERENCE TO RELATED APPLICATION

This application claims priority under 35 U.S.C. §119 to European patent application Ser. No. 12382165.4, filed 4 May 2012, content of which is incorporated herein by reference in its entirety

FIELD

The present embodiment of the disclosure relates to an unmanned air system (UAS) at least partly powered by a fuel cell. The unmanned air system (UAS) may comprise a lift device, such as a wing, having a high lift device such as a trailing edge flap.

BACKGROUND

Flight endurance of unmanned air systems is limited by an amount of energy that can be stored on board. For an electrically powered UAS this is limited by an amount of charge that can be stored in a battery and its state of charge, or for a fuel cell powered UAS this is limited by an amount of fuel for feeding a fuel cell that can be carried. Batteries are heavy. Hydrogen is commonly used as a fuel for feeding fuel cells but hydrogen is a very light molecule which is difficult to store without heavy containment vessels. Considerable amounts of hydrogen are also required for extended flight durations.

SUMMARY

Air is guided to a fuel cell carried by an unmanned air system. The fuel cell is ventilated by the guided air such that the guided air is heated by the fuel cell to provide heated air. The heated air is routed from the fuel cell to one or more high lift devices on a lift device of the unmanned air system to provide routed air. The routed air is blown across the high lift devices.

In an embodiment, an unmanned air system comprises: a fuel cell, an air intake, and a routing channel. The air intake guides air from outside the unmanned air system to the fuel cell for ventilating the fuel cell and heating the air to provide heated air. The routing channel supplies the heated air from the fuel cell to one or more high lift devices coupled to a lift device of the unmanned air system.

In another embodiment, a method of operation of a fuel-cell powered unmanned air system guides guided air to a fuel cell carried by the unmanned air system, and ventilates the fuel cell with the guided air such that the air is heated by the fuel cell to provide heated air. The method further routes the heated air from the fuel cell to one or more high lift devices on a lift device of the unmanned air system to provide routed air, and blows the routed air across the high lift devices.

In this manner, embodiments use exhaust air from a fuel cell to blow high lift devices of a UAS to improve its flight endurance and producing higher lift and lower drag.

The present embodiment of the disclosure provides an unmanned air system which is at least partly powered by a fuel cell. The unmanned air system may be an air vehicle or aircraft. The fuel cell may comprise, for example without limitation, a polymer membrane fuel cell (PEMFC), also known as a proton exchange membrane fuel cell. The unmanned air system comprises the fuel cell; an air intake arranged to guide air from outside the unmanned air system to the fuel cell for cooling the fuel cell and heating the air; and a routing channel arranged to supply the heated air from the fuel cell to one or more flaps, slats or other high lift device located on a lift device of the unmanned air system.

The lift device may be a wing or other surface for generating lift. The flaps may be trailing edge flaps. The slats may be leading edge slats. The air guided past the fuel cell provides oxygen as oxidant for the chemical reaction in the fuel cell, ventilates exhaust gases from the fuel cell, as well as cooling the fuel cell. The routing channel may also compress and/or accelerate the heated air before blowing it across the high lift device. The unmanned air system makes use of the heated air to increase lift and reduce drag instead of merely exhausting the heat. The increased lift and reduced drag as a result of delaying boundary layer separation may reduce the amount of fuel as hydrogen or power supplied in other forms such as batteries that are carried on board. The improved performance is most noticeable for air systems with poor aerodynamic performance.

The unmanned air system may further comprise one or more air current generators to draw air through the air intake, past the fuel cell, and blow it along the routing channel out to the flaps and/or slats. The air current generators may be fans or other device for causing an air current. There are various locations for positioning the one or more air current generators. At least one air current generator may be arranged downstream of the fuel cell to draw air through the fuel cell and blow the heated air into the routing channel.

Alternatively or additionally, at least one air current generator or fan may be arranged upstream of the fuel cell to draw air into the air intake and blow the air to the fuel cell. The air current generator(s) may be arranged so as to minimize air energy loss through the routing channel. The unmanned air system may further comprise one or more air scoops for directing fresh air from outside the UAS into the UAS towards the fuel cell.

The routing channel may be constricted such that before reaching an outlet the heated air is compressed or further compressed, and its speed increased. Compressed heated air will have high velocity increasing lift and reducing drag as it is blown over the wing.

The routing channel may further comprise a plenum chamber for air flow stabilization and piping or conduits for distributing of the heated air to the flaps. The plenum chamber may also provide even distribution of air flow to multiple pipes, for example if the left hand wing has separate distribution piping to that of the right hand wing. The piping routes the heated air proximate to the surface of the flaps. For trailing edge flaps it is routed to the front edge of the flap. In an alternative embodiment the routing may be performed by a cavity between a wing or airfoil skin and main and flap spars.

The fuel cell may be cylindrical and arranged for radial air flow into the fuel cell and axial flow out through the base of the cylindrical fuel cell.

The fuel cell may be arranged for axial air flow into and out of the fuel cell.

The routing channel may end with one or more nozzles to blow air across the one or more flaps or slats. The nozzles may provide a constriction to compress or further compress the heated air. The compression may also accelerate the heated air.

The one or more flaps may preferably be trailing edge flaps of the lift device. Such blown trailing edge flaps energize the air flow by adding the heated, fast-moving air to the air flow around the wing. This helps to keep the air flow attached to the wing, or reattaches the flow, thereby increasing efficiency. In an alternative or complimentary embodiment, slats on the leading edge of a lift device may be blown. Again the airflow over the upper surface of the lift device may be energized keeping the flow attached.

The present embodiment of the disclosure may also provide a short take-off and landing (STOL) UAS comprising the unmanned air system set out above.

The unmanned air system may be a motor glider or a low aspect ratio all lifting body. Other unmanned air systems are possible.

The present embodiment of the disclosure also provides a method of improving the performance of a fuel-cell powered unmanned air system, comprising: guiding air to the fuel cell carried by the unmanned air system; ventilating the fuel cell with the guided air such that the air is heated by the fuel cell; routing the air from the fuel cell to one or more flaps, slats, or high lift devices on a lift device of the unmanned air system; and blowing the routed air across the flaps or slats. The improved performance is an increase in lift-to-drag coefficient, such as by maintaining air flow attachment to the lift device, or an increase in lift.

There is also provided an air system for manned operation which is partly powered by fuel cells. The air system comprises: one or more fuel cells; an air intake arranged to guide air from outside the air system to the one or more fuel cells for ventilating the fuel cell and heating the air; and a routing channel arranged to supply the heated air from the fuel cell to the one or more flaps or slats located on a lift device of the air system.

BRIEF DESCRIPTION OF THE DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, fuel cells, and high lift devices may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a non-limiting application, namely, an aircraft. Embodiments of the disclosure, however, are not limited to such aircraft applications, and the techniques described herein may also be utilized in other applications. For example, embodiments may be applicable to ships, submarines, or other fuel cell or fluid dynamics applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Polymer membrane fuel cells (PEMFCs) are a suitable power source for a UAS because they are quiet and environmentally friendly. However, at their current development stage, they are unable to provide sufficient power for high demand situations such as take-off and climb for electric UASs. Hence, UASs rely on lithium-polymer (Li—Po) batteries to supply the additional power required in take-off and climb situations. This need for additional power imposes the requirement that a UAS needs to carry heavy Li—Po batteries for the whole flight, without any benefit and with the associated weight penalty.

Batteries and fuel cells have limited energy density and therefore ways are sought to either improve the energy density or to better use the energy that is available.

Conventional aircraft employ blown flaps or other high lift devices with jet or turboprop engines. These blown flaps use hot compressed air bled from the compressor stages of a jet engine or turboprop engine. Such flaps provide effective aerodynamic high lift devices.

Figure 1:
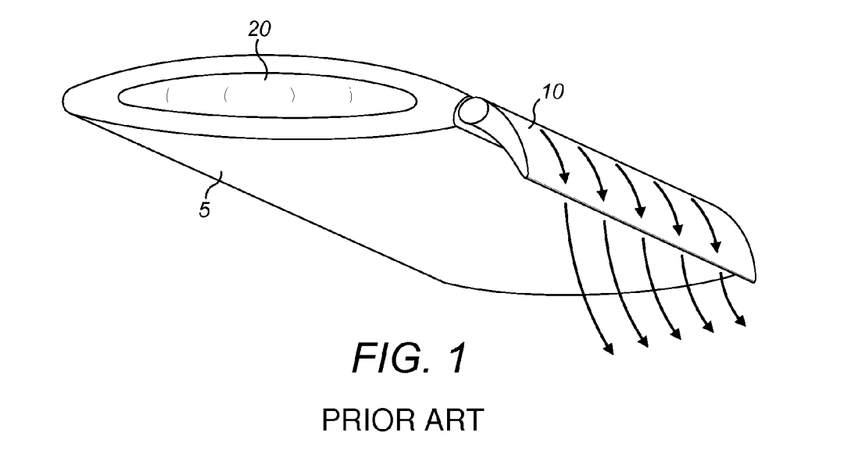
FIG. 1 is an illustration of a conventional internally blown flap of a wing.

FIG. 1 shows an example of a conventional blown flap 10 of a wing 5. A jet engine 20 is incorporated into the wing 5 and air is bled from the compressor stages of the jet engine 20 and fed via channels through the wing 5 to meet a trailing edge flap 10. This internal channeling of the bleed air provides an internally blown flap (IBF).

Figure 2:
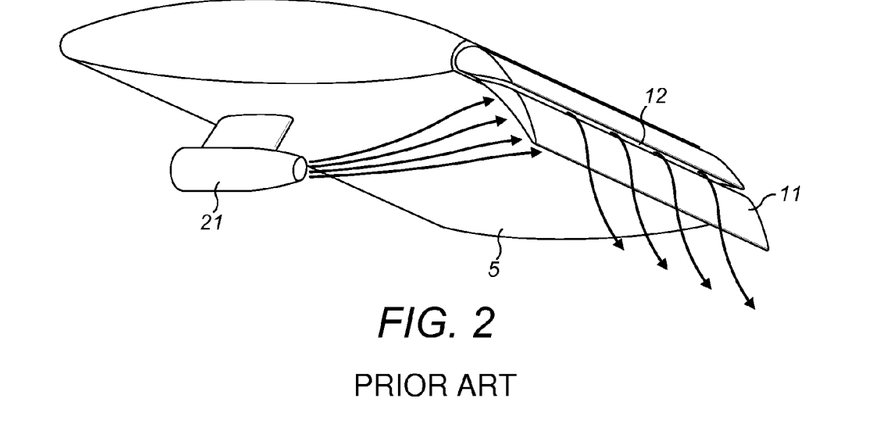
FIG. 2 is an illustration of a conventional externally blown flap of a wing.

FIG. 2 provides an alternative example of a conventional blown flap 11 in which a jet engine 21 is mounted under the wing 5. A flap 11 comprises a trailing edge flap with lengthwise slots 12 between sections of the flap 11. At least some of exhaust from the jet engine 21 will be incident on the flap 11. The incident exhaust passes through the slots 12 to pass over a top surface of the flap 11. This is an example of an externally blown flap (EBF). Further alternatives of a conventional blown flap arrangement exist such as an upper surface blown flap (USBF).

The heated air blown over the flaps helps the air flow around the wing or lift device to remain laminar and attached. This provides additional lift and reduces drag during take-off and climb operations.

The present embodiment of the disclosure relates to a use of exhaust air from a fuel cell to blow the flaps of a UAS to improve its flight endurance.

Polymer Membrane Fuel Cells (PEMFCs), also known as Proton Exchange Membrane Fuel Cells, provide quiet, environmentally friendly power for UAS propulsion. They provide electricity but as a by-product of the hydrolysis reaction heat is generated.

Air-cooled PEMFCs usually have fans to control the temperature of the UAS, particularly in high power demand situations such as take-off and climb. In these situations especially, a large amount of hot air is produced as a side effect of the cooling needs of the fuel cell. Conventionally this high energy, hot exhaust air from the fuel cell powered UAS is wasted.

The present embodiment of the disclosure uses this hot air to improve the performance of the UAS wings, especially during high-power operations, but also during cruise. Increased lift during take-off and climb operations would also reduce the amount of batteries required to be carried thereby reducing weight of the UAS ultimately resulting in greater endurance and longer mission times. By routing the fuel cell exhaust such that it is blown through the UAS flap area, this produces higher lift and lower drag.

PEMFCs operate at a relatively low temperature compared to jet engines, for example at around 70° C. (about 158° F.). Flight distances tend to be smaller for UAS when used for low altitude surveillance. This means the incorporation of a system for blowing the flaps of a UAS is more straightforward than for a full-scale conventional aircraft.

Figure 3:
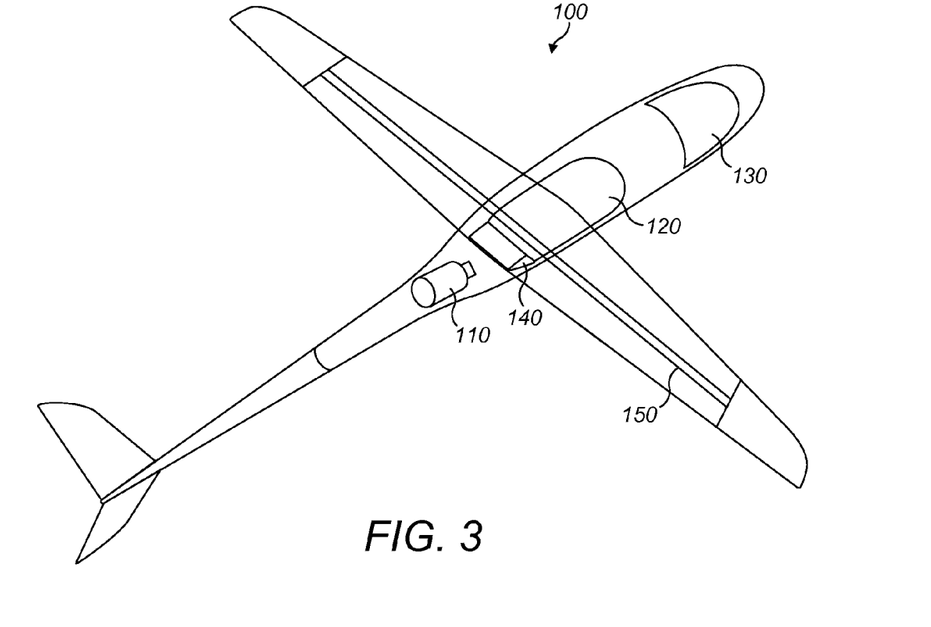
FIG. 3 is an illustration of fuel cell powered unmanned motor glider air system according to an embodiment of the disclosure.
Figure 4:
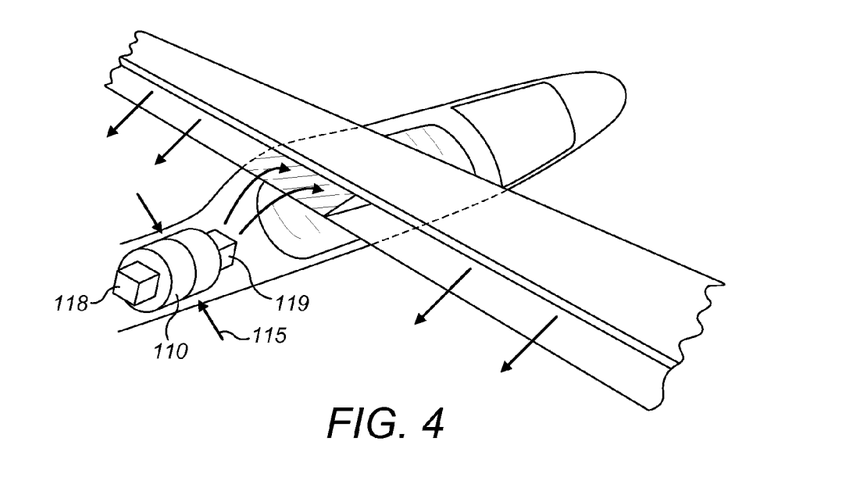
FIG. 4 an illustration of the fuel cell blown flaps arrangement of the air system of FIG. 3.

FIGS. 3 and 4 show an embodiment of an unmanned air system powered by a fuel cell 110. The UAS comprises a motor glider with a V-tail arrangement. Forward motion is provided by a pusher propeller arrangement driven by an electric motor. The UAS is powered by a fuel cell 110 located just rearward of the wings. In front of the fuel cell 110 in the fuselage under the wings and extending to just in front of the wings is a tank 120 for storing gaseous compressed hydrogen for the fuel cell 110. Toward the front of the UAS the payload 130 such as a camera, other sensing equipment, or device to be delivered, may be stored.

The fuel cell 110 comprises an electrochemical device that produces electricity, water and heat through an electrochemical reaction of fuel (e.g., hydrogen in this case) and oxidant such as oxygen. Other types of fuel cell 110 exist in which fuel other than hydrogen can be used. Air for the fuel cell 110 is drawn in through one or more inlets. The air, as well as providing the oxygen as oxidant for the fuel cell 110, also ventilates and cools the fuel cell 110. The fuel cell 110 operates in a radial way, that is, it has a hollow cylindrical shape with fresh air coming from an outside of the cylinder (115 in FIG. 4).

Fresh air is drawn in through an outer curved surface of the cylinder. Hot air is exhausted from the fuel cell 110 through an inner curved surface and out through bases of the cylinder after the electrochemical reaction has taken place. The air is drawn through the fuel cell 110 and out of the bases by fans 118, 119 mounted on the bases of the cylinder. The fans 118/119 produce a low pressure region in a centre of the fuel cell cylinder sucking the air and exhaust though the fuel cell 110. After the air has been extracted by forward pointing fan 119 it is blown into a routing channel where it is compressed and subsequently vented across the flaps. Backward pointing fan 118 directs the air back to cool the electric motor driving the pusher propeller.

The routing channel 150 (distribution piping 150) comprises a plenum chamber 140 for exhaust blow stabilization and distribution piping 150 as shown in FIG. 3. After passing through the plenum chamber 140, the air is routed to the flap area along each of the wings. As it passes to toward the flap the air is compressed such that the air leaving the routing channel 150 is both heated and compressed. The routing channel 150 receives the air at a first end closest to the fan 119. Here the routing channel 150 has adequate cross-sectional area and no compression occurs. The compression occurs at, or close to, outlets or ducts in the routing channel out though which the air flows, for example at nozzles close to the flap.

Figure 4A:
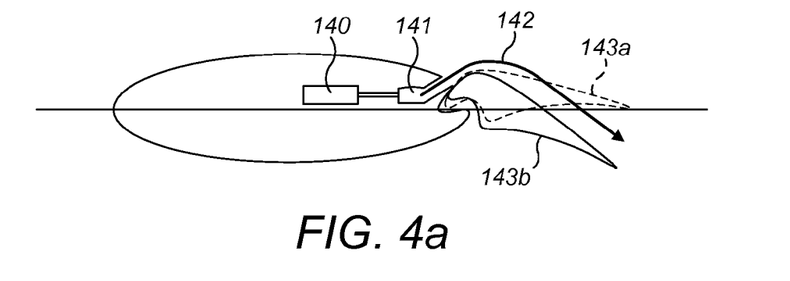
FIG. 4a is an illustration of a wing cross-section showing a blown flaps configuration according to an embodiment of the disclosure.

An advantage of having no compression of the exhaust gases near to the fuel cell 110 is that this avoids disturbing the electrochemical reaction of the fuel cell 110 by creating a higher exhaust side pressure. The routing can be located in hollow space between a main wing spar and a flap support spar. FIG. 4a shows the wing in cross-section. The plenum chamber 140 is shown coupled to a blowing slot 141. From there, high energy air 142 is blown over deflected flap 143b, which is also shown in an undeflected position 143a.

Figure 5:
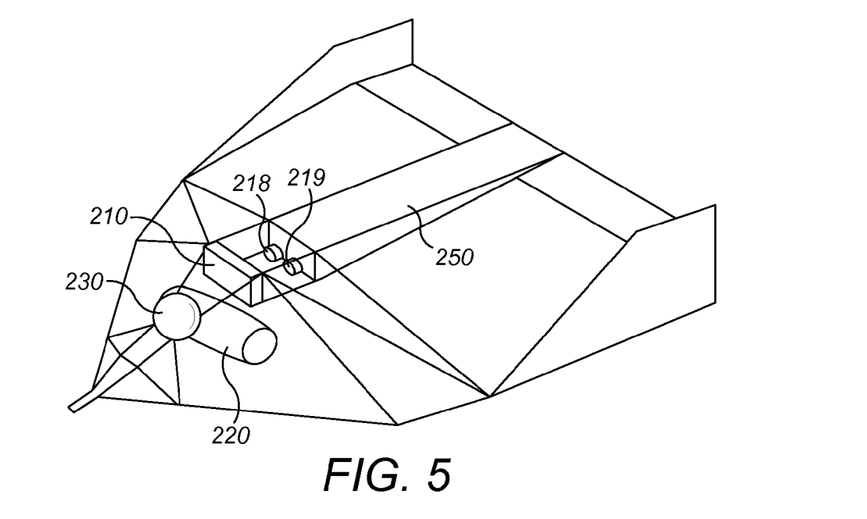
FIG. 5 is an illustration of fuel cell powered unmanned low aspect-ratio all lifting body air system according to an embodiment of the disclosure.
Figure 6:
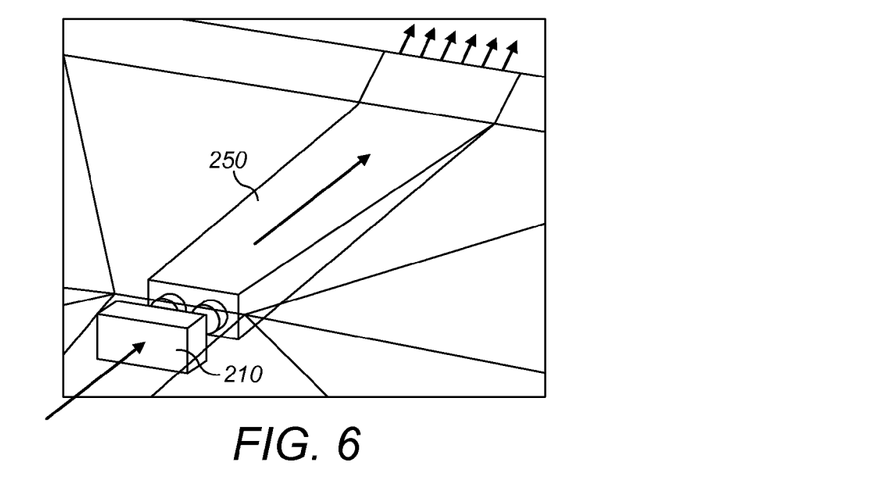
FIG. 6 is an illustration of the fuel cell blown flaps arrangement of the air system of FIG. 5.

In another embodiment the fuel cell blown flaps is applied to an alternative UAS, in this case a low aspect-ratio all lifting body (LAR-ALB) as shown in FIGS. 5 and 6. This low aspect-ratio all lifting body does not have a conventional fuselage with wings extending therefrom. Instead the body is shaped such that all areas form lift surfaces. A fuel cell 210, payload and hydrogen tank are all located towards the front of the body where the lifting body has its greatest vertical dimension. Tail fins are provided at either side of the rear of the lifting body.

In the LAR-ALB the fuel cell 210 is provided in a different configuration with air entering at one side and exiting through the opposite side. This is known as an axial arrangement. As shown in FIG. 5, a hydrogen fuel tank 220 and payload 230 are located forward of the fuel cell 210. Rearward of the fuel cell are located fans 218, 219 and routing channel 250. Air enters the UAS through an air intake and is directed towards the front face of the fuel cell 210. Fans 218, 219 are located at the rear side of the fuel. For example, they may be mounted on the rear face of the fuel cell, or mounted at the entrance to the routing channel 250 as shown in FIGS. 5 and 6. The fans reduce the pressure inside and/or immediately after the fuel cell, sucking air and exhaust gases through and out of the fuel cell.

The fuel cell 210 is fed with hydrogen gas from the hydrogen fuel tank 220. Fresh air enters the fuel cell 210 though the front side and exits after the electrochemical reaction has taken place by means of the fans 218 and 219 which are arranged to draw air through the fuel cell 210. The routing channel 250 has a larger cross-sectional area close to the fans, with the cross-sectional area reducing towards the flaps. The routing channel 250 has a substantially rectangular cross-section which reduces in height and increases in width towards the flaps.

At the end of the routing channel 250 closest to the fans 218 and 219, the channel has adequate cross-section and no compression occurs here. The cross-section reduces close to the flaps and the heated compressed air is blown directly across the flaps through one or more nozzles. FIG. 6 shows the air being blown over a flap section having the same width as the routing channel 250, although the routing channel 250 can also be arranged to supply the heated compressed air to other flaps, larger flaps, or multiple flaps.

Figure 7:
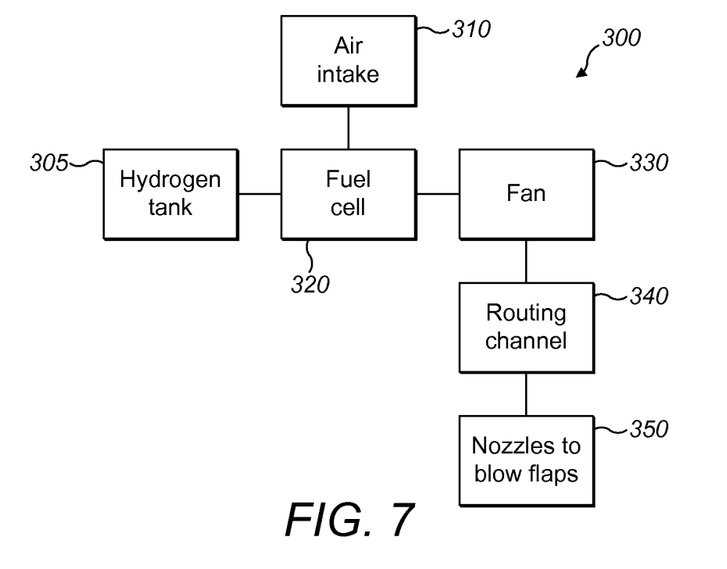
FIG. 7 is an illustration of a block diagram of component parts of a fuel cell blown flaps system.

FIG. 7 is a block diagram of the components of a fuel cell blown flaps system 300 (system 300). The system 300 may comprise: a hydrogen tank 305, an air intake 310, a fuel cell 320, a fan 330, a routing channel 340, and nozzles 350 to blow flaps.

The hydrogen tank 305 is configured to store the compressed gaseous hydrogen fuel for the fuel cell 320.

The air intake 310 is configured to receive air from outside the UAS and supply the received air to the fuel cell 320. The air comprises oxygen which is used as oxidant in the fuel cell 320. The air also acts as coolant and ventilates the fuel cell 320.

The fuel cell 320 in configured to provide electrical power for the UAS. To operate efficiently the fuel cell 320 should be maintained within an operating temperature range. The fuel cell 320 also requires ventilation to remove the exhaust water vapor. The exhaust and heat is carried away from the fuel cell 320 in the air drawn through the fuel cell 320 by one or more fans 330. The drawn air is blown into routing channel 340 where it is guided towards the flaps. The flaps comprise trailing edge flaps at the rear of a lift device such as a wing.

The routing channel 340 is configured to guide the air towards high lift devices such as flaps. The heated air is compressed and emitted on to the upper surface of the flap such that the heated air flows across the flap. The compression can take place in the nozzles 350 arranged at the end of the routing channel 340 at the air is emitted on to the flaps. Alternatively the routing channel 340 may reduce in cross-sectional area steadily compressing the air as it is moved towards the flaps. The nozzles 350 may perform the compression in a short distance, whereas the routing channel may perform the compression over a longer distance. The compressed heated air is emitted to flow over the flap and has high velocity to increase lift and reduce drag.

Figure 8:
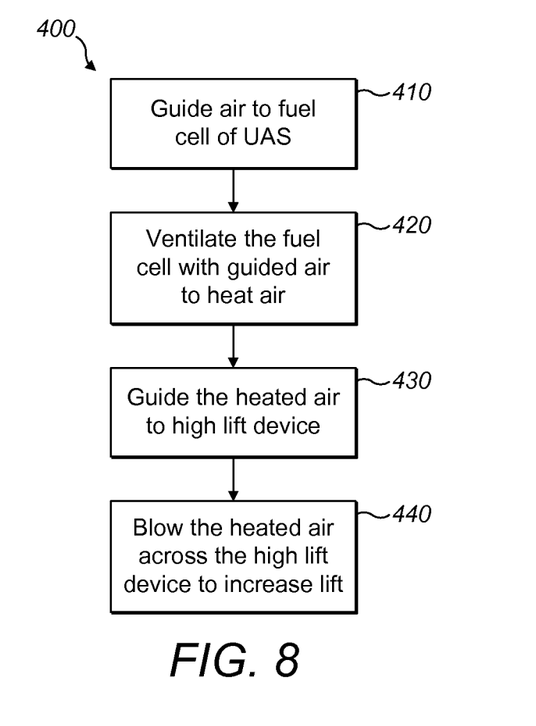
FIG. 8 is a flowchart showing a process of blowing the flaps of an unmanned air system with fuel cell heated air according to an embodiment of the disclosure.

FIG. 8 is a flowchart showing a process 400 of blowing the flaps of an unmanned air system with fuel cell heated air. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as processor module in which the computer-readable medium is stored.

It should be appreciated that process 400 may include any number of additional or alternative tasks, the tasks shown in FIG. 8 need not be performed in the illustrated order, and process 400 may be incorporated into a more comprehensive procedure or process having additional functionality not described in detail herein. In some embodiments, portions of the process 400 may be performed by different elements of the system 300 such as: the hydrogen tank 305, the air intake 310, the fuel cell 320, the fan 330, the routing channel 340, the nozzles 350, etc. Process 400 may have functions, material, and structures that are similar to the embodiments shown in FIGS. 1-7. Therefore common features, functions, and elements may not be redundantly described here.

At task 410 external air is guided into the UAS and towards the fuel cell. The air ventilates, cools, and provides oxygen to the fuel cell at step 420. After passing through the fuel cell the air is heated. At task 430 the heated air guided to a high lift device on the UAS and at step 440 the heated air is blown across the high lift device to increase lift.

Conventional fuel cell powered unmanned air systems merely exhaust heated air from the fuel cell to the outside. Thus no use is made of the heat. Although conventional aircraft may use blown flaps with compressed heated air supplied from a jet engine or turboprop, the use of heated air from a fuel cell has not been previously employed for blown flaps. The heated air from the fuel cell may be compressed and this is performed in the present embodiment of the disclosure by the routing channel 340, outlets, or the nozzles 350.

The heated compressed air blown across the flaps provides additional lift, without requiring additional energy to be supplied, excepting for the small amount of electrical power to the fans. The extra lift can, for example, be used to reduce the power drawn from the fuel cell during cruising. Thus, the present embodiment of the disclosure makes use of more of the available energy thereby improving performance and/or increasing endurance for no extra hydrogen fuel consumption. In some embodiments even the fans may not be necessary. For example, the air intake and routing channel may be shaped to capture air and draw it through the fuel cell, compressing it by a constriction at the outlet. In such an embodiment, adequate cooling of the fuel cell is still required to maintain control of reaction rate.

Some unmanned air systems carry batteries as well as a fuel cell. The battery is used to provide extra power during high-power requirement phases of flight such as during take-off, or can be used to extend endurance beyond that of the hydrogen fuel provided for the fuel cell. The fuel cell blown flaps will also allow the number of batteries carried to be reduced, which will also reduce the weight of the UAS. Miniature unmanned air systems having a take-off weight less than about 25 Kg (about 55 lbs) are too small to be provided with conventional blown flap technology from jets or turboprops. The fuel cell blown flaps enables the use of blown flaps in miniature UAS.

In more detail, the use of blown flap technology described herein could allow mission times to be extended by 30% for the LAR-ALB embodiment. The fuel cell blown flap arrangement may also provide sufficient lift for nearly vertical take-off and landing or at least short take-off and landing. Any reduction in runway length for take-off would result in a reduction in the infrastructure required, which would both be beneficial in terms of cost reduction as well as opening up more possibilities for launch sites.

Table 1 below summarizes the expected improvements achieved when using fuel cell blown flap technology for the LAR-ALB embodiment for a particular mission profile. In the mission, after a take-off phase the UAS cruises to an area where it remains loitering for as long as is possible with the fuel available on board. Most of the mission is performed in loiter which consumes less power than cruise.

TABLE 1

Comparison of hydrogen consumption and endurance for conventional LAR-ALB to that with fuel cell blown flaps.

| | Baseline configuration | FC Blown Flaps configuration | Improvement |
| --- | --- | --- | --- |
| Take-off (Max lift) | 1.78 g $H_2$ | 1.52 g $H_2$ | 117% |
| Cruise (Max lift to drag ratio) | 19.2 g $H_2$ | 6.20 g $H_2$ | 310% |
| Remnant Hydrogen | 109.82 g $H_2$ | 136.02 g $H_2$ | 124% |
| Loiter Time | 1 h 32 min | 2 h 22 min | 138% |
| Expected Endurance | 2 h 20 min | 3 h | 128% |

A typical mission, such as the baseline configuration used for the comparison in Table 1, is to climb to about 200 m (about 656 feet) at full power, cruise to an area about 30 km (about 98425 feet) away, and loiter there for as long as possible. For the LAR-ALB UAS the design cruise speed is 28 m/s (about 92 feet/s) and the optimum climb speed is 11 m/s (about 36 feet/s). The values in the Table 1 assume an initial amount of available hydrogen of about 150 g (about 5.3 oz). The amount of hydrogen for loiter is the remnant, which is calculated by assuming the fuel required to cruise to and from a loiter-area are the same. The remnant is then equal to the initial 150 g (5.3 oz) (reduced by an amount for take-off and two times an amount for cruise.

A conventional LAR-ALB unmanned air vehicle powered by fuel cells and battery has a total endurance time of two hours and twenty minutes. The values of hydrogen consumption are in grams of hydrogen for each stage of the mission. As mentioned above the total endurance can be increased by around 30% to three hours using fuel cell blown flaps. This is a significant endurance increase. In comparison, the addition of winglets to the ends of wings of commercial passenger airliners provides only a 10-15% performance increase.

The extension of loiter times by around 38% also means a reduction in the number of take-off and landing cycles for a given surveillance mission. While these cycles are the most fuel hungry of the mission they are also the most risky. The impact of the reduction in these cycles is more difficult to quantify, but is clearly significant.

The economic benefits of the endurance improvement allow longer mission times and/or reduced costs per mission. Over a fleet of unmanned air systems the savings are even more noticeable. Furthermore, the resulting reduction in hydrogen consumption also reduces the amount of hydrogen required to be stored on the ground, with consequential reductions in shipping/delivery.

In a different mission scenario a UAS carries a cargo from one point to another for delivery, with similar advantages to the loiter mission.

There are environmental benefits because the PEMFC fuel cells are fed by hydrogen and so do not emit any CO2. Fuel cells are also easier to recycle than batteries.

The person skilled in the art will readily appreciate that various modifications and alterations may be made to the above described fuel cell blown flaps system without departing from the scope of the appended claims. For example, different shapes, dimensions and materials may be used. Fans and nozzles may or may not be used and the type of unmanned air system may be varied.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Also, as used herein, unless expressly stated otherwise, "attached" means that one element/node/feature is directly mechanically joined, fused or force compressed by an application of heat and/or pressure "to another element/node/feature. Thus, although FIG. 3-7 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An unmanned air system, comprising:
a fuel cell;
an air intake operable to guide air from outside the unmanned air system to the fuel cell for ventilating the fuel cell and heating the air to provide heated air; and
a routing channel operable to supply the heated air from the fuel cell to one or more high lift devices coupled to a lift device of the unmanned air system, wherein the routing channel ends with one or more nozzles operable to blow air across the one or more high lift devices, and wherein one or more nozzles provide a constriction to compress or further compress the heated air.

2. The unmanned air system of claim 1, further comprising one or more air current generators operable to draw air through the air intake, past the fuel cell, and blow the air along the routing channel out to the high lift devices.

3. The unmanned air system of claim 2, wherein the one or more air current generators comprise one or more fans.

4. The unmanned air system of claim 3, wherein at least one fan of the one or more fans is arranged downstream of the fuel cell to draw air through the fuel cell and blow the heated air into the routing channel.

5. The unmanned air system of claim 3, wherein at least one fan of the one or more fans is arranged upstream of the fuel cell to draw air into the air intake and blow the air to the fuel cell.

6. The unmanned air system of claim 1, wherein the routing channel is constricted such that before reaching an outlet the heated air is compressed.

7. The unmanned air system of claim 1, wherein the routing channel further comprises a plenum chamber for air flow stabilization and distribution piping for distributing the heated air to the high lift devices.

8. The unmanned air system of claim 1, wherein the fuel cell comprises a cylindrical fuel cell and is configured for radial air flow into the fuel cell and axial flow out through a base of the cylindrical fuel cell.

9. The unmanned air system of claim 1, wherein the fuel cell is arranged for axial air flow into and out of the fuel cell.

10. The unmanned air system of claim 1, wherein the fuel cell comprises a polymer membrane fuel cell (PEMFC).

11. The unmanned air system of claim 1, wherein the high lift devices comprise: a flap, a trailing edge flap, a slat, or a combination thereof.

12. The unmanned air system of claim 1, wherein the unmanned air system comprises a short take-off and landing UAS, a low aspect ratio all lifting body, a miniature UAS, or a motor glider.

13. A method of operation of a fuel-cell powered unmanned air system, comprising:
   guiding guided air to a fuel cell carried by the unmanned air system;
   ventilating the fuel cell with the guided air such that the air is heated by the fuel cell to provide heated air;
   routing the heated air from the fuel cell to one or more high lift devices on a lift device of the unmanned air system to provide routed air, wherein the air is drawn through an air intake, past the fuel cell, and blown along a routing channel out to the high lift devices;
   blowing the routed air across the high lift devices,
   wherein the routing channel ends with one or more nozzles operable to blow air across the one or more high lift devices,
   and wherein one or more nozzles provide a constriction to compress or further compress the heated air.

14. The method of claim 13, further comprising arranging one or more air current generators upstream of the fuel cell to draw the air into the air intake and blow the air to the fuel cell.

15. The method of claim 13, further comprising compressing the heated air before reaching an outlet via a constriction of the routing channel.

16. The method of claim 13, further comprising arranging the fuel cell to be operable for axial air flow into and out of the fuel cell.

17. The method of claim 13, wherein the high lift devices comprise: a flap, a trailing edge flap, a slat, or a combination thereof.

18. The method of claim 13, wherein the fuel cell comprises a polymer membrane fuel cell (PEMFC).

* * * * *